(12) United States Patent
Hamilton et al.

(10) Patent No.: US 11,560,024 B1
(45) Date of Patent: Jan. 24, 2023

(54) SYSTEM, APPARATUS AND METHOD FOR ADJUSTING AIR PRESSURE IN A TIRE

(71) Applicant: William Robert Hamilton, III, Huntington Beach, CA (US)

(72) Inventors: William Robert Hamilton, Huntington Beach, CA (US); William Robert Hamilton, III, Huntington Beach, CA (US)

(*) Notice: Subject to any disclaimer, the term of this patent is extended or adjusted under 35 U.S.C. 154(b) by 419 days.

(21) Appl. No.: 17/000,248

(22) Filed: Aug. 21, 2020

(51) Int. Cl.
  *B60C 23/00* (2006.01)
  *B60C 29/06* (2006.01)
  *B60C 29/04* (2006.01)

(52) U.S. Cl.
  CPC .. *B60C 23/00354* (2020.05); *B60C 23/00318* (2020.05); *B60C 23/00363* (2020.05); *B60C 29/04* (2013.01); *B60C 29/066* (2013.01)

(58) Field of Classification Search
  CPC ........ B60C 23/00354; B60C 23/00318; B60C 23/00363; B60C 29/04; B60C 29/066
  See application file for complete search history.

(56) References Cited

U.S. PATENT DOCUMENTS

| | | |
|---|---|---|
| 3,931,998 A | 1/1976 | Carson |
| RE29,116 E | 1/1977 | Guy et al. |
| 4,010,052 A | 3/1977 | Edwards |
| 4,043,370 A | 8/1977 | Unwin et al. |
| 4,153,096 A | 5/1979 | Kirk |
| 4,236,565 A | 12/1980 | Iwabuchi |
| 4,269,252 A | 5/1981 | Shapiro |
| 4,324,280 A | 4/1982 | Kubota |
| 4,337,814 A | 7/1982 | Grawey |
| 4,349,064 A * | 9/1982 | Booth ................ B60C 23/126 417/233 |
| 4,364,427 A | 12/1982 | Lefrancois |
| 4,404,985 A | 9/1983 | Stasiunas |
| 4,453,992 A | 6/1984 | Kuan et al. |
| 4,462,449 A | 7/1984 | Zabel, Jr. |
| 4,466,472 A | 8/1984 | Hendrickx |
| 4,570,691 A * | 2/1986 | Martus ................ B60C 23/126 152/332.1 |
| 4,682,640 A | 7/1987 | Berger et al. |
| 4,735,248 A | 4/1988 | Cizaire |

(Continued)

FOREIGN PATENT DOCUMENTS

| | | | |
|---|---|---|---|
| WO | WO-2008144694 A1 * | 11/2008 | .......... B60C 23/004 |
| WO | WO-2010141638 A1 * | 12/2010 | ............ B60C 23/12 |

*Primary Examiner* — Scott A Browne
(74) *Attorney, Agent, or Firm* — Rutan & Tucker, LLP; Kyle M. St. James

(57) ABSTRACT

A pressure adjustment device for adjusting air pressure within a tire of a vehicle is disclosed. The device includes a housing formed of a cap and a base and including a piston, a spring and an air valve, wherein the cap includes an air inlet and the base includes an air outlet that is in fluid communication with the neck, wherein the piston moves proximally to compress the spring in response to a presence of a centrifugal force due to the vehicle traveling at least at a predetermined speed, where the proximal movement of the piston activates the air valve thereby enabling fluid to flow into the housing, and where the spring is configured to decompress when the centrifugal force decreases thereby deactivating the air valve and compressing the fluid within the housing distally out the air outlet toward the tire.

20 Claims, 5 Drawing Sheets

(56) References Cited

U.S. PATENT DOCUMENTS

| | | | |
|---|---|---|---|
| 4,793,395 A | 12/1988 | Mahan | |
| 4,869,306 A | 9/1989 | Keys | |
| 5,181,977 A | 1/1993 | Gneiding et al. | |
| 5,301,729 A | 4/1994 | Blair | |
| 5,398,744 A | 3/1995 | Street et al. | |
| 5,479,975 A | 1/1996 | Fogal, Sr. et al. | |
| 5,538,061 A | 7/1996 | Blair | |
| 5,556,489 A * | 9/1996 | Curlett | B60C 23/133 |
| | | | 417/233 |
| 5,558,117 A | 9/1996 | McGuinness | |
| 5,558,730 A * | 9/1996 | Olney | B60C 23/004 |
| | | | 417/233 |
| 5,679,184 A | 10/1997 | Hosking | |
| 5,693,161 A | 12/1997 | Ho | |
| 5,803,108 A | 9/1998 | Schuessler, Jr. et al. | |
| 5,988,245 A | 11/1999 | Rosenberg | |
| 6,035,885 A | 3/2000 | Schuessler, Jr. et al. | |
| 6,152,165 A | 11/2000 | Fukuda | |
| 6,155,313 A | 12/2000 | Smalley | |
| 6,247,513 B1 | 6/2001 | Lukins | |
| 6,354,348 B1 | 3/2002 | Taillandier | |
| 6,722,409 B1 | 4/2004 | Martin | |
| 6,772,812 B1 | 8/2004 | Hamilton | |
| 7,234,485 B2 | 6/2007 | Yamamoto et al. | |
| 7,237,590 B2 | 7/2007 | Loewe | |
| 7,404,412 B2 | 7/2008 | Milanovich et al. | |
| 7,536,904 B1 | 5/2009 | Yu | |
| 8,122,927 B2 | 2/2012 | Sinyard et al. | |
| 8,344,868 B2 | 1/2013 | Browne et al. | |
| 9,557,073 B2 | 1/2017 | Breed et al. | |
| 9,776,120 B2 | 10/2017 | Raether | |
| 9,919,874 B2 | 3/2018 | Roberts | |
| 10,093,136 B2 | 10/2018 | Gobinath et al. | |
| 10,099,508 B2 | 10/2018 | Labuschagne | |
| 10,507,626 B2 | 12/2019 | Bonneville et al. | |
| 2002/0108690 A1 | 8/2002 | Liu | |
| 2003/0173012 A1 | 9/2003 | Jimenez Rivero | |
| 2004/0182490 A1 | 9/2004 | Saheki | |
| 2008/0078450 A1 | 4/2008 | Milanovich et al. | |
| 2010/0064792 A1 | 3/2010 | Chuang et al. | |
| 2010/0282388 A1 | 11/2010 | Kelly | |
| 2011/0120611 A1 | 5/2011 | Hansen | |
| 2012/0073716 A1 | 3/2012 | Benedict | |
| 2012/0090752 A1 | 4/2012 | Hinque et al. | |
| 2012/0090753 A1 | 4/2012 | Hinque et al. | |
| 2012/0125504 A1 | 5/2012 | Delgado et al. | |
| 2012/0160386 A1 | 6/2012 | Hinque et al. | |
| 2013/0092306 A1 | 4/2013 | White | |
| 2014/0110029 A1 | 4/2014 | Benedict et al. | |
| 2014/0174622 A1 | 6/2014 | Hinque | |
| 2020/0039303 A1 * | 2/2020 | Thornton | B60C 23/127 |

* cited by examiner

SYSTEM, APPARATUS AND METHOD FOR ADJUSTING AIR PRESSURE IN A TIRE

FIELD

Embodiments of the invention relate to the field of air flow devices, and particularly, air valves.

BACKGROUND

During normal use of a vehicle, tire pressure decreases over time due to, among other things, air diffusion. As a result, a vehicle owner is routinely required to check or monitor the air pressure and act to maintain the tire pressure at a specified level. As is understood, failing to maintain tire pressure at an adequate level may diminish fuel economy, reduce the life of the tire and negatively affect vehicle braking and handling.

Although many vehicles today include computerized systems that automatically monitor tire pressure and alert a driver of low pressure, such systems still require the owner to take action to refill the tire to a desire tire pressure level. Thus, what is needed is a device that automatically adjusts the pressure level in order to maintain the pressure level at or substantially at a desired level.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known structures and techniques have not been shown in detail in order not to obscure the understanding of this description. Those of ordinary skill in the art, with the included descriptions, will be able to implement appropriate functionality without undue experimentation.

References in the specification to "one embodiment" or "an embodiment," may indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that such feature, structure, or characteristic may be deployed in connection with other embodiments whether or not explicitly described.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Lastly, as this invention is susceptible to embodiments of many different forms, it is intended that the present disclosure be considered as an example of the principles of the invention and not intended to limit the invention to the specific embodiments shown and described.

Figure 1A:
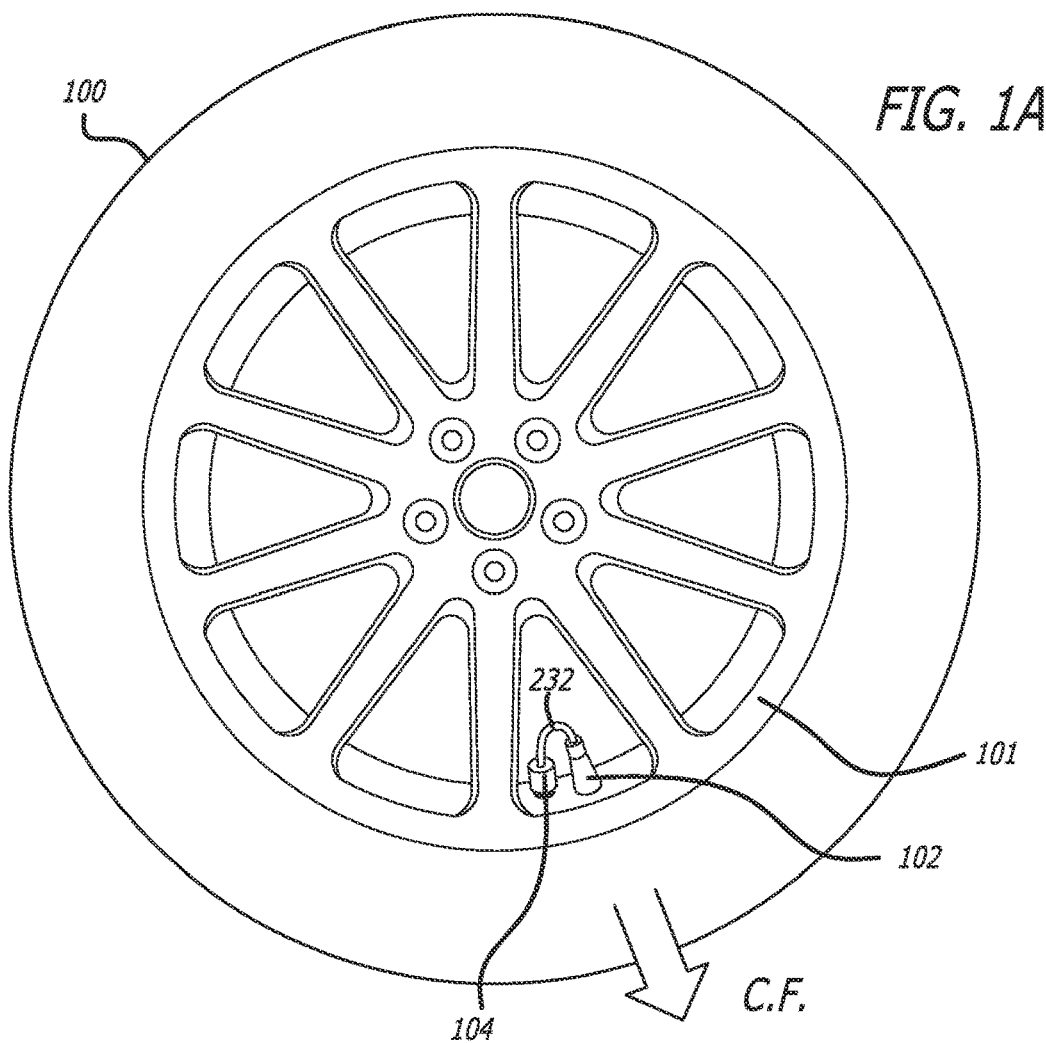
FIG. 1A illustrates a plan view of an air pressure adjustment device coupled to a vehicle tire according to some embodiments.
Figure 1B:
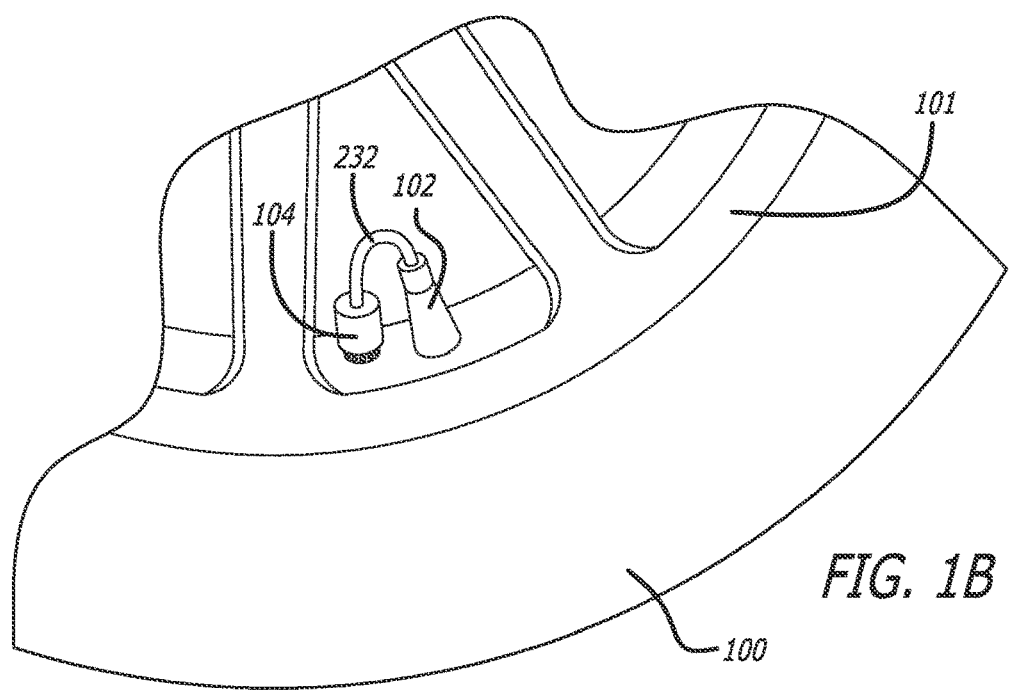
FIG. 1B illustrates a detailed section of FIG. 1A according to some embodiments.

Referring to FIG. 1A, a plan view of an air pressure adjustment device coupled to a vehicle tire is shown according to some embodiments. The air pressure adjustment device 104 is shown as being coupled with the air valve 102 of a vehicle tire 100. In some embodiments, the device 104 may couple to the air valve 102 via a threaded coupling. In one embodiment, a conventional threaded cap that is traditionally located on the air valve 102 may be removed and replaced with the device 104. FIG. 1B illustrates a detailed portion of the tire 100 of FIG. 1A. In some embodiments, the device 104 may include a flexible neck portion that fluidly connects the housing of the device 104 to the threaded coupling component that mates with the air valve 102. Further, in some embodiments, the device 104 may be configured to couple with the rim 101 of the tire 100, e.g., through an adhesive included on, or applied to, the device 104. In other embodiments, the neck of the device 104 may be stiff and restrict movement of the housing the device 104.

Discussed here briefly prior to a more detailed discussion below, the device 104 couples to the air valve 102 such that fluid (e.g., air) may flow through the device 104 into the tire 100. More specifically, the device 104 includes a spring and a piston housed in an internal chamber. As the vehicle begins to accelerate and move at a speed at or above a threshold, the device 104 spins in a circular motion in sync with the tire 100. Thus, a centrifugal force acts on the spring and piston within the device 104. The spring is configured and specifically designed such that when the vehicle is moving at a speed at or above the threshold, the centrifugal force moves the piston against and compresses the spring. Such movement and compression activates an air valve enabling external air to flow through the air valve and into an internal cavity within the chamber.

As the vehicle begins to slow, the centrifugal force decreases and is overcome by the force created by the compression of the spring. As a result, the piston is pushed toward its previous position resulting in the deactivation of the valve and the compression of the air in the internal cavity as the air cannot flow back out through valve. Thus, the air is compressed into the tire 100 when the force of generated by the compressed air overcomes the air pressure of the tire 100. As a result, the air pressure within the tire 100 may be maintained at a desired level.

It is noted that in order for the centrifugal force to act on the piston in the proper direction, the device 104 is to be coupled to the tire valve 102 in a specific orientation. Such an orientation is evident based on a review of the figures discussed herein, for example FIGS. 1-3C, such that the air inlet 208 is adjacent to and facing the rim 101 of the tire 100.

Figure 2A:
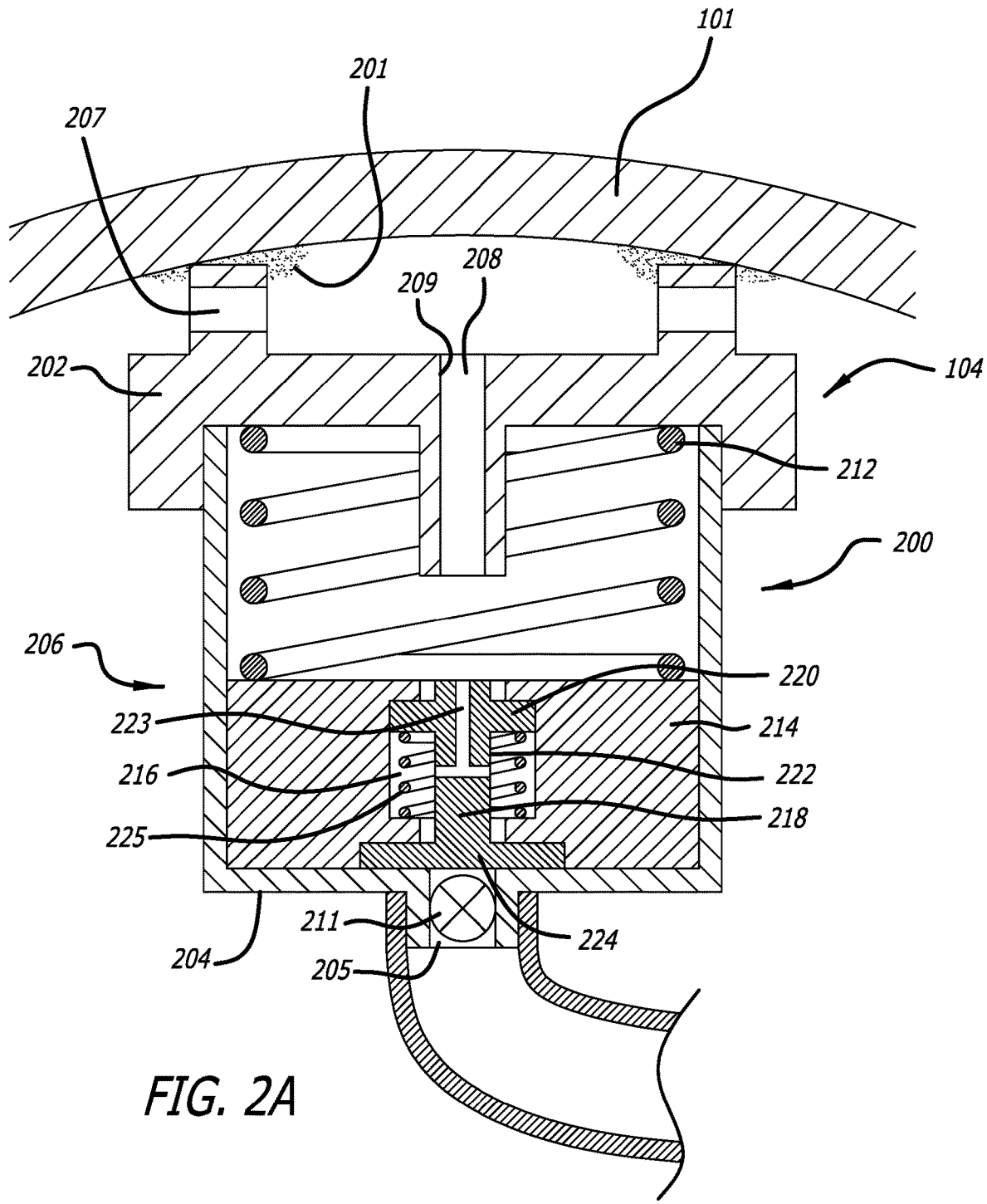
FIG. 2A illustrates a cross-sectional view of an air pressure adjustment device in a first state according to some embodiments.

Referring now to FIG. 2A, a cross-sectional view of an air pressure adjustment device in a first state is shown according to some embodiments. The air pressure adjustment device 104 includes a housing 200 comprising a cap 202 and a base 204. In some embodiments, the cap 202 may be removably coupled to the base 204, e.g., via a threaded coupling (see FIG. 3). However, in other embodiments, the cap 202 may be permanently sealed to the base 204. The cap 202 includes an air inlet 208 and the base 204 includes an air outlet 205 that opens into a neck 232 (see FIG. 2C) that directs air toward the tire 100. In some embodiments, an additional one-way check valve 211 is located at the distal end of the air outlet 205.

As shown, an inner lip 209 is located within the housing 200 at the air inlet 208. The base 204 includes one or more sides 206 (e.g., the device may be a cylinder, trapezoid or other shape). The housing 200 forms an internal chamber that houses a spring 212, a piston 214 and an air valve 218, where the air valve 218 is disposed within a lumen 216 of the piston 214. The configuration of the spring 212 and the piston 214 may be described as the spring 212 being proximal the piston 214 (and the piston 214 being distal the spring 212) relative to the air inlet 208. In some embodiments, the cap 202 may include one or more proximally extending portions that include air passageways 207 (see also FIG. 3), where the one or more proximally extending portions contact and may be coupled to the rim 101 with an adhesive 201, such an epoxy.

The air valve 218 includes upper ledge 220, a shaft 222, a lumen 223, a stopper 224 and a valve spring 225 disposed around the shaft 222, where the upper ledge 220 extends away from the shaft 222 (e.g., in a perpendicular or substantially perpendicular manner). The air valve 218 is disposed within the lumen 216 to create a one-way fluid seal such that fluid (e.g., air) can pass distal the piston 214 only through the lumen 216 when the air valve 218 is in an activated state (e.g., the spring 225 is compressed). Further, the piston 214 fluidly seals a proximal portion of the chamber of the housing 200 from a distal portion. Thus, once fluid passes through the lumen 216 into an interior cavity (i.e., cavity 230 of FIG. 2B), the fluid is prevented from flowing back out through the air inlet 208, unless the air valve 218 is activated.

A first state of the air pressure adjustment device 104 includes the piston 214 being in a first, distal position as illustrated in FIG. 2A. The device 104 is in the first state when the vehicle is stopped or traveling at a speed below a threshold as mentioned above. In particular, the spring 212 is compressed when a force is exerted on the piston 214 in accordance with Hooke's Law, where the force is equal to a proportional constant of the spring 212 (e.g., a measure of the spring's stiffness) multiplied by the amount of change in the equilibrium length of the spring 212.

As the vehicle begins to move and accelerate, the tire 100 begins to rotate such that a centrifugal force begins to act on the piston 214. As the vehicle reaches a speed threshold, the centrifugal force equals and exceeds the force required to compress the spring 212. As a result, the piston 214 moves in a proximal direction compressing the spring 212.

Figure 2B:
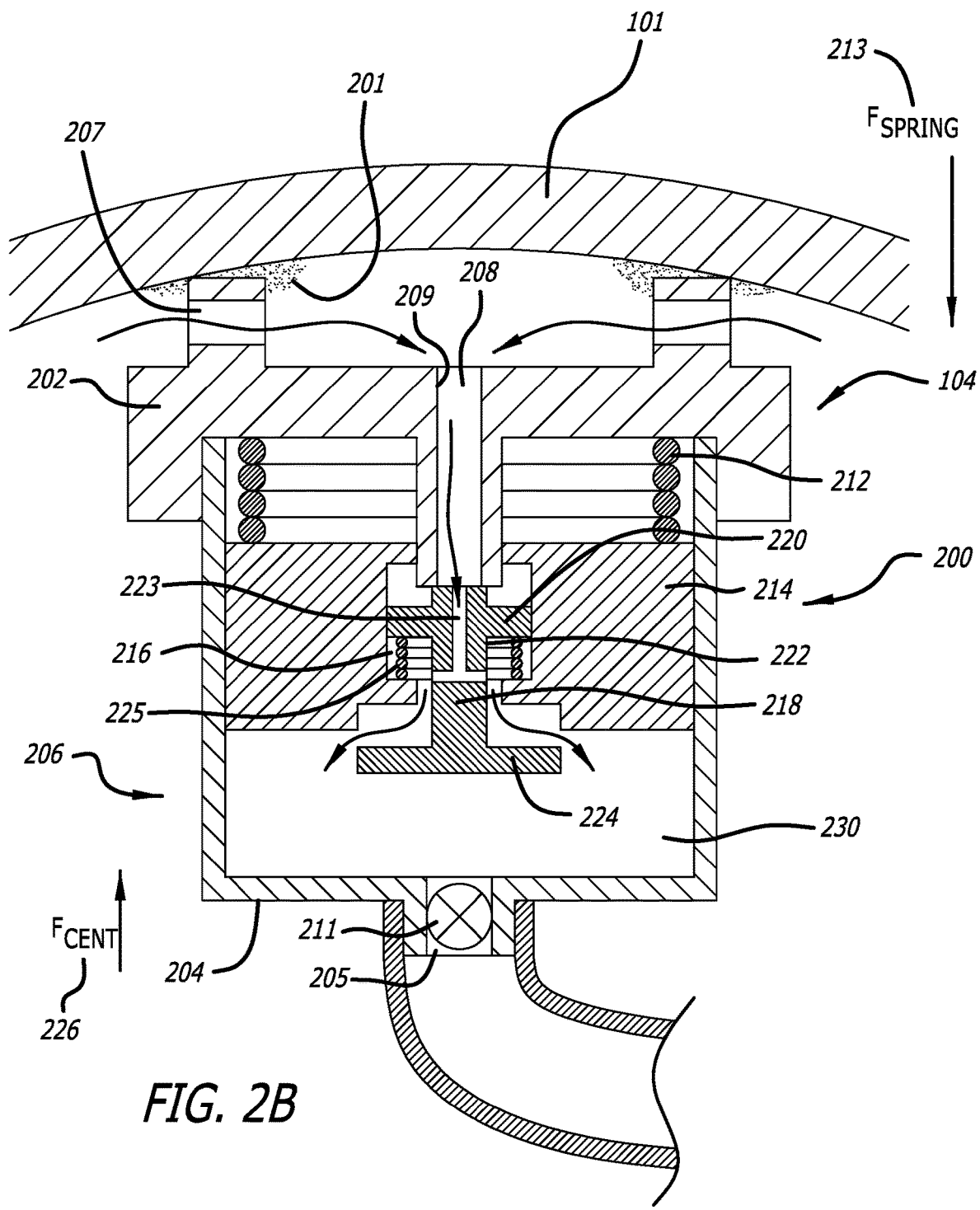
FIG. 2B illustrates a cross-sectional view of the air pressure adjustment device of FIG. 2A in a second state according to some embodiments.

Referring now to FIG. 2B, a cross-sectional view of the air pressure adjustment device of FIG. 2A in a second state is shown according to some embodiments. FIG. 2B illustrates the device 104 in a second state with the piston 214 in a proximal position and the spring 212 being compressed. As illustrated, a centrifugal force 226 is acting upon the piston 214 such that the piston 214 moves in the proximal direction compressing the spring 212. The movement of the piston 214 in the proximal direction creates an interior cavity 230 within the housing 200.

Additionally, the proximal movement of piston 214 results in the activation of the air valve 218, which enables air 228 to enter the device 104, pass through the air valve 218 and fill the cavity 230. Specifically, as the piston 214 moves in the proximal direction, the proximal edge of the air valve 218 contacts the lip 209, which stops movement of the shaft 222. However, the piston 214 continues to move in the proximal direction due to the centrifugal force 226 causing the spring 225 to compress. As the spring 225 compresses, air is able to pass through the lumen 223 into the interior cavity 230.

As the vehicle continues to move at or above the speed threshold, the device 104 remains in the second state. However, as the vehicle begins to slow and move at a speed below the speed threshold, the centrifugal force 226 begins to decrease. As the force of the spring 213 gradually overcomes the centrifugal force 226, the spring 212 begins to decompress pushing the piston 214 in a distal direction. Further, as the spring 212 decompresses and the piston 214 moves in the distal direction, the spring 225 also decompresses deactivating the air valve 218, as the spring 225 biases the air valve 218 in a deactivated (closed) state.

Figure 2C:
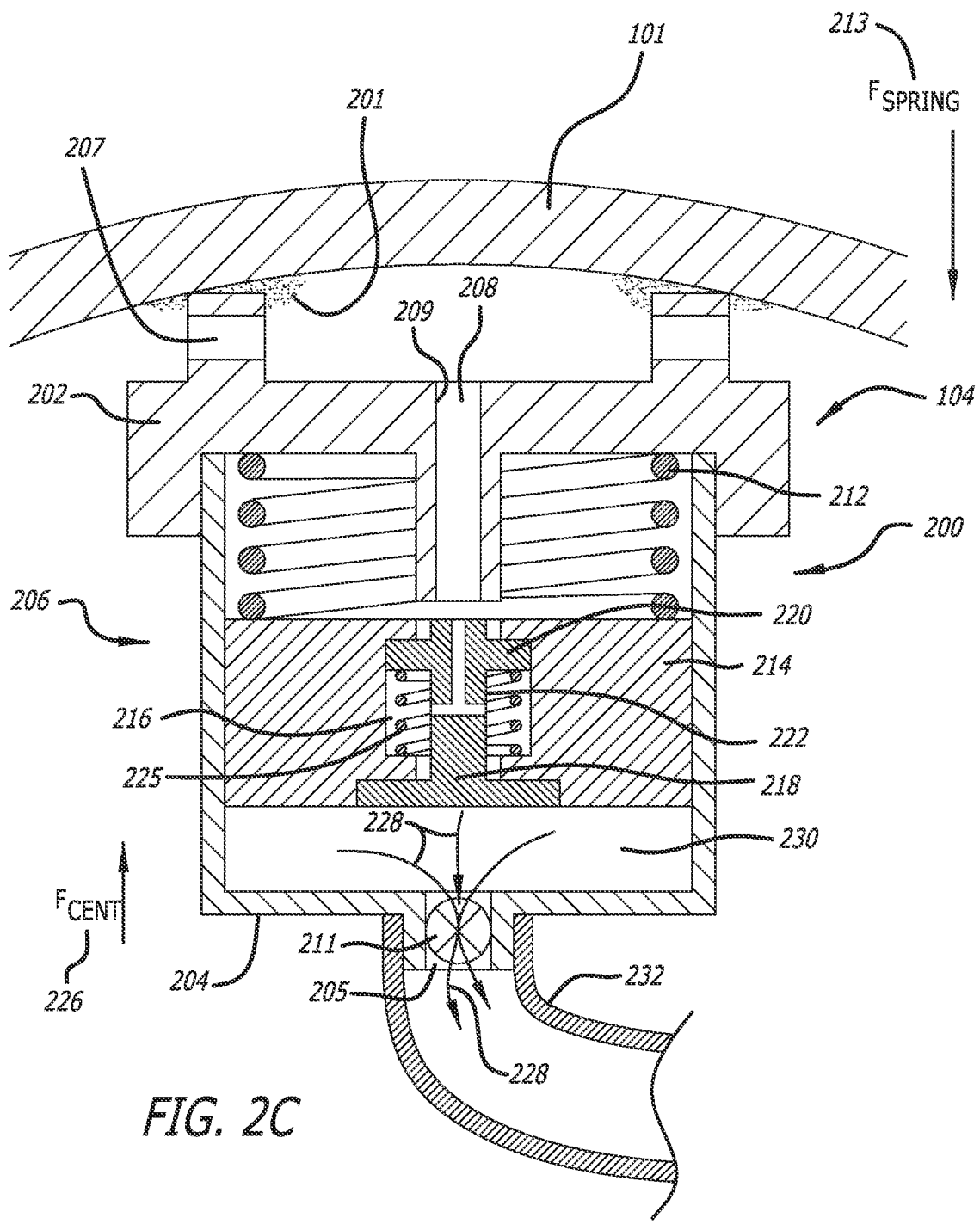
FIG. 2C illustrates a cross-sectional view of the air pressure adjustment device of FIG. 2A in a third state according to some embodiments.

Referring to FIG. 2C, a cross-sectional view of the air pressure adjustment device of FIG. 2A in a third state is shown according to some embodiments. FIG. 2C illustrates the device 104 in a third state with the piston 214 partially between the proximal position of FIG. 2B and the distal position of FIG. 2A. Continuing from the description of FIG. 2B, the air valve 218 is no longer in contact with the lip 209 and is thus not activated (due to the biasing of the spring 225). As a result, the air 228 that filled the cavity 230 is being compressed in the distal direction. When the pressure generated by the compression of the air 228 by the spring 212 exceeds the necessary pressure to activate the air valve 102 (e.g., exceeds the air pressure of the tire 100), the compression of the air 228 activates the air valve 102 and enters the tire 100.

In some embodiments, the internal diameter of the housing 200 may be 0.8 inches and the height may be 2.5 inches. Further, the height of the piston 214 may be 0.5 inches. In some embodiments, the length of the spring 212 may be within the range of 0.75-1.5 inches, when in an uncompressed state.

Figure 3:
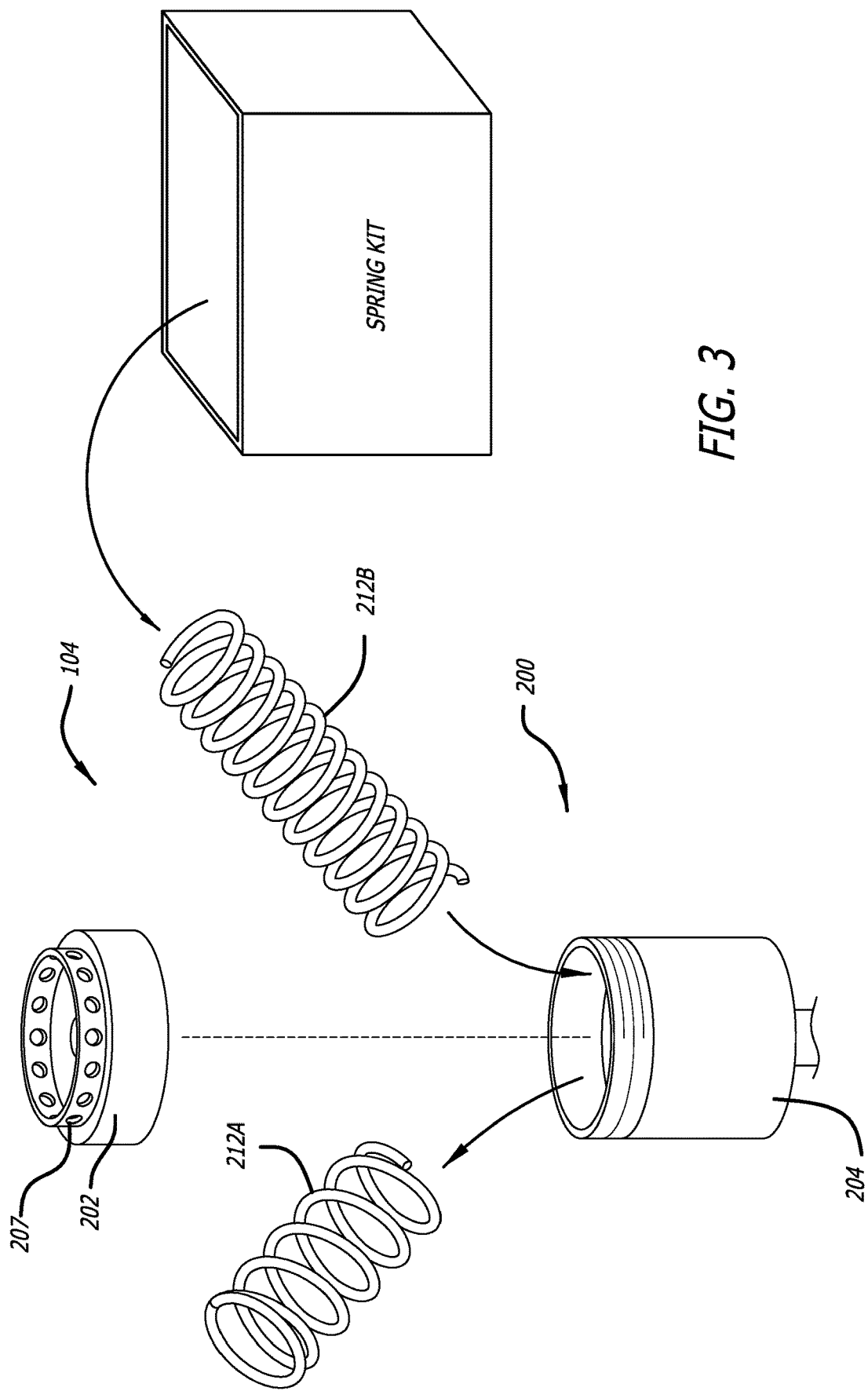
FIG. 3 is a diagram illustrating an air pressure adjustment system according to some embodiments.

Referring to FIG. 3, a diagram illustrating an air pressure adjustment system is shown in accordance with some embodiments. The air pressure adjustment device 104 is shown as including the cap 202 and the base 204, where the two components are threadably couplable. Further, the air pressure adjustment system may include a plurality of springs 212A-212B. It should be noted that the system is not limited to just two springs but two are merely illustrated for purposes of clarity. Thus, a user may threadably remove the cap 202 from the base 204, remove the spring 212A, insert the 212B and threadably couple the cap 202 with the base 204. In such an embodiment, the spring 212A and 212B may have varying spring constants (e.g., varying levels of stiffness). As a result, the user may alter the speed of the vehicle required to activate the air valve 218.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A pressure adjustment device for adjusting air pressure within a tire of a vehicle, comprising:

a housing formed from a cap and a base, the housing including a piston, a spring and an air valve, wherein the cap includes an air inlet and the base includes an air outlet, wherein the spring is located proximal the piston, wherein the piston and the spring are configured such that the piston moves proximally to compress the spring in response to a presence of a centrifugal force due to the vehicle traveling at least at a predetermined speed, wherein proximal movement of the piston activates the air valve thereby enabling fluid to flow into the housing, and wherein the spring is configured to decompress when the centrifugal force decreases thereby deactivating the air valve and compressing the fluid within the housing distally out the air outlet toward the tire;

a neck extending from a distal portion of the base, wherein the neck is in fluid communication with the air outlet, wherein a distal end of the neck is configured to couple with the tire.

2. The pressure adjustment device of claim 1, wherein a one-way check valve is included at a distal end of the air outlet.

3. The pressure adjustment device of claim 1, wherein the cap is threadably couplable to the base.

4. The pressure adjustment device of claim 1, wherein the cap includes a proximally extending portion that includes one or more air passageways.

5. The pressure adjustment device of claim 4, wherein the proximally extending portion is configured with an adhesive configured to affix the proximally extending portion to a rim of the tire.

6. The pressure adjustment device of claim 1, wherein the piston is configured to create a fluid seal within the housing.

7. The pressure adjustment device of claim 1, wherein activation of the air valve includes a proximal edge of the air valve contacting an inner lip of the base as a result of the proximal movement of the piston.

8. The pressure adjustment device of claim 1, wherein the air valve includes a valve spring that biases the air valve in a deactivated state, wherein fluid is prevented from passing through the air valve when in the deactivated state.

9. The pressure adjustment device of claim 8, wherein the valve spring is configured to decompress as the spring decompresses thereby preventing fluid within a distal portion of the housing from flowing proximally through the air valve.

10. The pressure adjustment device of claim 9, wherein fluid flows from the housing to the tire through the neck.

11. A system for adjusting air pressure within a tire of a vehicle, comprising:

a pressure adjustment device including a housing formed from a cap and a base, the housing including a piston and an air valve, a neck extending from a distal portion of the base, wherein a distal end of the neck is configured to couple with the tire, wherein the cap is removably couplable to the base; and, a spring, wherein the cap includes an air inlet and the base includes an air outlet that is in fluid communication with the neck, wherein the spring is located proximal the piston, wherein the piston and the spring are configured such that the piston moves proximally to compress the spring in response to a presence of a centrifugal force due to the vehicle traveling at least at a predetermined speed, wherein proximal movement of the piston activates the air valve thereby enabling fluid to flow into the housing, and wherein the spring is configured to decompress when the centrifugal force decreases thereby deactivating the air valve and compressing the fluid within the housing distally out the air outlet toward the tire.

12. The system of claim 11, wherein a one-way check valve is included at a distal end of the air outlet.

13. The system of claim 11, wherein the cap is threadably couplable to the base.

14. The system of claim 11, wherein the cap includes a proximally extending portion that includes one or more air passageways.

15. The system of claim 14, wherein the proximally extending portion is configured with an adhesive configured to affix the proximally extending portion to a rim of the tire.

16. The system of claim 11, wherein the piston is configured to create a fluid seal within the housing.

17. The system of claim 11, wherein activation of the air valve includes a proximal edge of the air valve contacting an inner lip of the base as a result of the proximal movement of the piston.

18. The system of claim 11, wherein the air valve includes a valve spring that biases the air valve in a deactivated state, wherein fluid is prevented from passing through the air valve when in the deactivated state.

19. The system of claim 18, wherein the valve spring is configured to decompress as the spring decompresses thereby preventing fluid within a distal portion of the housing from flowing proximally through the air valve.

20. The system of claim 19, wherein fluid flows from the housing to the tire through the neck.

* * * * *